(12) United States Patent
Miyao (10) Patent No.: US 9,797,749 B2
(45) Date of Patent: Oct. 24, 2017

(54) RESOLVER

(71) Applicant: MINEBEA CO., LTD., Nagano (JP)

(72) Inventor: Kazuki Miyao, Fukuroi (JP)

(73) Assignee: MINEBEA CO., LTD., Nagano (JP)

( * ) Notice: Subject to any disclaimer, the term of this patent is extended or adjusted under 35 U.S.C. 154(b) by 75 days.

(21) Appl. No.: 14/581,545

(22) Filed: Dec. 23, 2014

(65) Prior Publication Data

US 2015/0338243 A1 Nov. 26, 2015

(30) Foreign Application Priority Data

May 21, 2014 (JP) .................. 2014-105326

(51) Int. Cl.
*G01D 5/20* (2006.01)
*H01F 41/10* (2006.01)
*H02K 3/32* (2006.01)
*H02K 3/52* (2006.01)

(52) U.S. Cl.
CPC .......... *G01D 5/2046* (2013.01); *H01F 41/10* (2013.01); *H02K 3/325* (2013.01); *H02K 3/522* (2013.01); *Y10T 29/49073* (2015.01)

(58) Field of Classification Search
CPC ..... G01D 5/2046; H01F 41/066; H01F 27/30; H01F 38/18; H01F 41/10; H02K 3/325; H02K 3/52; H02K 3/522; H02K 24/00
USPC .................................... 324/207.16
See application file for complete search history.

(56) References Cited

U.S. PATENT DOCUMENTS 5,808,465 A * 9/1998 Gentile .................. B21D 43/09
318/661

| | | | |
|---|---|---|---|
| 6,933,636 B2 * | 8/2005 | Miya ...................... | H02K 3/522 310/40 R |
| 2004/0051410 A1 * | 3/2004 | Miya .................. | H02K 15/0056 310/71 |
| 2004/0055148 A1 * | 3/2004 | Miya .................. | H02K 15/0056 29/735 |
| 2004/0119350 A1 | 6/2004 | Miya et al. | |
| 2005/0212511 A1 * | 9/2005 | Kujirai ................. | G01D 5/2046 324/207.25 |

(Continued)

FOREIGN PATENT DOCUMENTS

JP S61-002754 U 1/1986
JP S63-009250 3/1988

(Continued)

OTHER PUBLICATIONS

Jul. 1, 2016 Office Action issued in Japanese Application No. 2014-105326.

*Primary Examiner* — Jermele M Hollington
*Assistant Examiner* — Christopher McAndrew
(74) *Attorney, Agent, or Firm* — Oliff PLC (57) ABSTRACT

A resolver has a lead wire that can be slack even in a structure in which it is impossible to maintain the distance between an end of wound wire and a terminal pin without using a special jig. A lead wire of a stator coil 500 is entwined on a plurality of terminal pins 603 in a slack condition, and the entwined parts are fixed by soldering or welding. Terminal base 600 is then moved to a stator core 200 side, and the lead wire is made slack by contacting the lower surface of a terminal base body 601 to the upper surface of the stator core 200. Next, end part of the pins 306 of a primary insulator 300 are melted so as to fix the terminal base 600.

10 Claims, 10 Drawing Sheets

(56) References Cited

U.S. PATENT DOCUMENTS

| | | | | |
|---|---|---|---|---|
| 2005/0212512 A1* | 9/2005 | Matsuura | ............. | G01D 5/2046 324/207.25 |
| 2005/0280320 A1* | 12/2005 | Utsumi | ................ | G01D 5/2046 310/43 |
| 2006/0238044 A1* | 10/2006 | Miya | .................. | H02K 15/0056 310/71 |
| 2009/0179632 A1* | 7/2009 | Nishiguchi | .......... | G01D 5/2046 324/207.25 |
| 2010/0156401 A1* | 6/2010 | Nishiguchi | .......... | G01D 5/2046 324/207.25 |
| 2011/0043196 A1* | 2/2011 | Fujita | .................. | G01D 5/2046 324/207.16 |
| 2011/0074400 A1* | 3/2011 | Nakano | ................ | G01D 5/2046 324/207.25 |
| 2012/0176123 A1* | 7/2012 | Manabe | ............. | G01D 5/2046 324/207.17 |
| 2012/0262158 A1* | 10/2012 | Matsuura | ............. | G01D 5/2046 324/207.17 |
| 2012/0274316 A1* | 11/2012 | Matsuura | ............. | G01D 5/2046 324/207.17 |
| 2013/0162243 A1* | 6/2013 | Ochiai | ................. | G01D 5/2046 324/207.16 |
| 2013/0193957 A1* | 8/2013 | Zhou | .................... | G01D 5/2046 324/207.16 |
| 2013/0200884 A1* | 8/2013 | Manabe | ................... | G01B 7/14 324/207.16 |
| 2014/0125324 A1* | 5/2014 | Jin | ....................... | G01D 5/2046 324/207.13 |
| 2014/0285186 A1* | 9/2014 | Stusak | .................... | G01B 7/30 324/207.17 |

FOREIGN PATENT DOCUMENTS

| | | |
|---|---|---|
| JP | S06-024965 | 6/1994 |
| JP | H07-298535 A | 11/1995 |
| JP | A-2004-64821 | 2/2004 |
| JP | 2004-120873 A | 4/2004 |
| JP | 2006-180618 A | 7/2006 |

* cited by examiner

RESOLVER

TECHNICAL FIELD

The present invention relates to resolvers, and in particular, relates to a technique in which a lead wire extending from an end of a wound wire of a stator coil is slack after the lead wire is connected to a terminal pin, in a VR type resolver (variable reluctance type resolver) for example.

BACKGROUND ART

A VR type resolver that is used for detection of rotation position or the like has a structure in which a plurality of salient poles for magnetic poles are projected from a circular stator core in an outer or inner direction of the radial direction, and a rotor that is constructed of magnetic material is arranged inside or outside of the stator having a wound wire wound around the salient poles thereof.

Here, a terminal holding part having a plurality of terminal pins is arranged in the stator, and a lead wire extending from an end of a wound wire wound around the plurality of salient poles of the stator, is entwined at the plurality of terminal pins. In such a structure, if the lead wire from the stator to the terminal pin is under tension, the lead wire may break due to temperature changes or the like. Japanese Unexamined Patent Application Publication No. 2004-64821 discloses that in an inner rotor type resolver in which a terminal holding part for supporting a plurality of terminal pins is arranged at an outer circumferential part of a stator, a jig is projected from a hole arranged at the terminal holding part, a lead wire is hung on the jig and entwined at the plurality of terminal pins, and then the jig is removed from the terminal holding part. According to this technique, since the lead wire that has been held up by the jig is slack after removing the jig, breakage of the wire can be avoided.

However, it is difficult to arrange the jig, in a case in which there is no room at outside like the outer rotor type resolver having rotor at outside of the stator, or in a case in which a distance between the end of the wound wire and the terminal pin cannot be maintained even in the inner type resolver disclosed in the above publication. An object of the present invention is to provide a resolver in which the special jig disclosed in the publication is not necessary and the lead wire can be slack even in a structure in which it is impossible to maintain the distance between the end of the winding wire and the terminal pin.

SUMMARY OF THE INVENTION

The resolver of the present invention includes a rotor, a stator core having a plurality of salient poles, an insulator covering the plurality of salient poles of the stator core for insulating, a wound wire wound around the plurality of salient poles, a plurality of terminals to which lead wire is connected from the end of the wound wire, and a terminal holding part holding the plurality of terminals, in which the terminal holding part is arranged to be movable to the insulator so that the terminal holding part can be arranged at a primary position at which the lead wire is attached to the terminal while being under tension, and a secondary position at which the lead wire under tension can be slack, and the resolver further includes a fixing means to fix the terminal holding part at the secondary position.

In the resolver having the above structure, since the lead wire can be slack by moving the terminal holding part after the lead wire is connected to the terminal, the jig disclosed in the publication is no longer necessary, and the lead wire can be slack even in the structure in which the distance between the end of the wound wire and the terminal pin cannot be maintained. Furthermore, since the terminal holding part is movable with respect to the insulator, the moving direction can be appropriately selected and the degree of freedom in design is increased compared to a conventional construction in which a terminal is directly formed on an insulator, thereby enabling the needs of the user to be accommodated.

Here, it is desirable that the terminal holding part be arranged so as to be movable along the thickness direction (axial direction) of the stator core. By such a structure, it is no longer necessary to project the terminal holding part toward the outer circumference of the insulator, thereby enabling reduction in size of the resolver. This aspect can be employed not only in an outer rotor type resolver in which the rotor is arranged outside of the stator core, but also in an inner rotor type resolver in which the rotor is arranged inside of the stator core. It should be noted that the terminal holding part can be held by the insulator or the stator core, or by both of them.

In the above aspect, it is desirable that the stator core have a hole which opens at a surface facing the thickness direction, and that the terminal holding part engage in the hole in a condition freely going forward and back. In this aspect, since a part of the terminal holding part comes into the hole, the size of the resolver along the axial direction can be reduced.

The fixing means can have a pin that is arranged on the insulator, and can have a hole that is formed at the terminal holding part and to which the pin engages. The pin is inserted in the hole when the terminal holding part is arranged at the secondary position, and the end part of the pin is fixed to the hole so that the terminal holding part is fixed at the secondary position. The pin is thermally fused if the pin material is plastic. Alternatively, the pin can be fixed to the hole by soldering or welding if the pin material is metal. It should be noted that these can also be fixed by an adhesive.

The fixing means can have a pin that is arranged on the terminal holding part, and can have a hole that is formed in the stator core and to which the pin engages. The pin is press-fitted in the hole when the terminal holding part is arranged at the secondary position, so that the terminal holding part is fixed at the secondary position. In this aspect, since the pin is press-fitted into the hole by moving the terminal holding part to the secondary position, there are fewer processes and the operation can be simplified. In addition, since the pin is fixed to the stator core, the terminal holding part can be strongly fixed.

The terminal holding part can be arranged on the insulator that is movable along the radial direction of the stator core. Since the plurality of salient poles project toward the outside direction of the radial direction of the stator core in the outer rotor type resolver, the terminal holding part is arranged inside of the stator core. On the other hand, since the a plurality of salient poles project toward the inside direction of the radial direction of the stator core in the inner rotor type resolver, the terminal holding part is arranged at the outer circumferential side of the stator core. In this aspect, since the lead wire becomes slack by moving the terminal holding part closer to the stator core side, the amount of projection of the terminal holding part in the radial direction can be reduced, thereby reducing the size of the resolver.

A structure to enable the moving of the terminal holding part along the radial direction may be freely chosen, and the terminal holding part and the insulator can be connected via a known guide mechanism. For example, a guide projecting in an outer direction of the radial direction of the stator core is arranged on the insulator, and a rail guiding the guide is arranged at the terminal holding part. Then, the guide and the rail are mutually fixed when the terminal holding part is arranged at the secondary position, so that the terminal holding part is fixed at the secondary position. A means for fixing the guide and the rail can be freely selected. If the material thereof is plastic, they may be thermally fused. Alternatively, if the material thereof is metal, they can be fixed by soldering or welding. It should be noted that an adhesive can also be used to fix them.

Next, the method for producing the resolver of the present invention includes the following steps: (1) a step of arranging an insulator on a stator core having a plurality of salient poles, which insulates the plurality of salient poles of the stator core by covering it, (2) a step of winding a wound wire around the plurality of salient poles, (3) a step of attaching a terminal holding part having a plurality of terminals onto at least one of the insulator and the stator core, (4) a step of attaching a lead wire from the end of the wound wire onto the plurality of terminals so that the lead wire is under tension, (5) a step of making the lead wire under tension slack by moving the terminal holding part, and (6) a step of fixing the terminal holding part to at least one of the insulator and the stator core while maintaining the slack condition of the lead wire. By such a method for production of a resolver, the jig disclosed in the publication is no longer necessary, and the lead wire can be slack even in a structure in which it is impossible to maintain the distance between the end of the wound wire and the terminal pin.

Here, most of the above steps can be performed by a known wire winding device. That is, the stator core is attached to a wire winding device to perform the step (2) after the steps (1) and (3) are completed, the step (4) is performed and the lead wire is fixed to the terminal by the wire winding device while maintaining the condition in which the terminal holding part is held by the wire winding device, and the steps (5) and (6) are performed by the wire winding device. It should be noted that a known method such as welding, soldering, and brazing can be performed as a method to fix the wound wire to the terminal.

As the step (1) in which the insulator is arranged on a stator core having a plurality of salient poles, which insulates the plurality of salient poles of the stator core by covering it, for example, a known method can be employed, such as an insert molding method in which a stator core stacked by thin plates of magnetic material such as silicon steel is arranged in a mold and an insulating synthesized resin is injected in a cavity of the mold so as to be molded, or a method in which insulators produced by injection molding are disposed at front and back surfaces of a stator core.

Furthermore, in the step (3) in which the terminal holding part having a plurality of terminal pins is attached on at least one of the insulator and the stator core, the terminal holding part, which is positioned with respect to the stator core, can be attached to the insulator or stator core by a robot hand or a human hand. It should be noted that the wire winding device can include such a function.

According to the present invention, since the lead wire is made slack by moving the terminal holding part after the lead wire is attached to the plurality of terminals, a special jig is no longer necessary, the lead wire can be slack even in a structure in which the distance between the end of the wound wire and the terminal cannot be maintained.

MODE FOR CARRYING OUT THE INVENT

1. Structure of Embodiment

Figure 1:
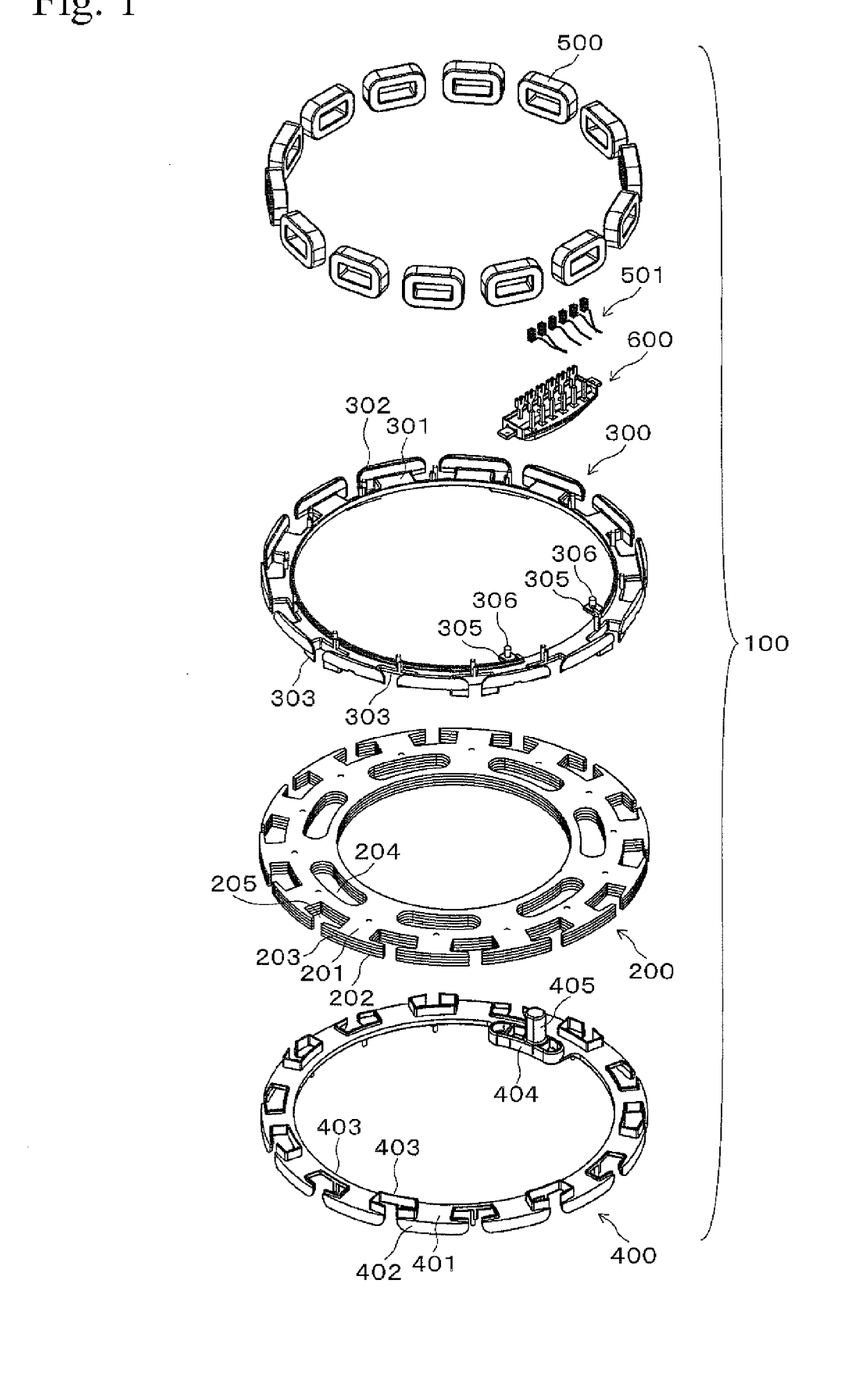
FIG. 1 is an exploded perspective view showing the stator in the VR type resolver according to the first Embodiment of the present invention.

FIG. 1 is an exploded perspective view in which a stator 100 in the VR type resolver according to the first Embodiment is shown in a disassembled condition in the axial direction. The stator 100 has an approximately circular shape. A rotor constructed of a soft-magnetic material is held outside of the stator 100 in a rotatable condition with respect to the stator 100. It should be noted that figures and explanation regarding the rotor structure is omitted because it is the same as that used in an ordinary VR type resolver.

The stator 100 includes a stator core 200. The stator core 200 has a structure in which a soft-magnetic material (silicon steel plate, for example) is processed by press-cutting into an approximately circular shape and the multiple plates are stacked along the axial direction, as shown in FIG. 1. In the stator core 200, a plurality of salient poles 201 extending toward an outer radial direction are formed. The plurality of salient poles 201 function as a magnetic pole, and a stator coil (wound wire) 500 is formed by winding a wound wire around the salient poles via an insulator, mentioned below FIG. 1 shows the stator coils 500 in a virtual condition in which they are detached from the plurality of salient poles 201. At the top part of the salient poles 201, a salient pole top part 202 extending flatly along circumferential direction is formed. At the outer circumferential surface of the salient pole top part 202, a salient pole surface 203 facing a rotor, which is not, shown, is formed. Furthermore, in the stator core 200, a plurality of holes 204 having an approximately arc shape are formed along a circumferential direction, at the inner circumferential part around the central hole of the stator core 200.

The stator core 200 is sandwiched between a primary insulator 300 and a secondary insulator 400 from upper and lower directions along the axial direction. That is, the insulator that is attached to the stator core 200 has a structure that can be divided into the primary insulator 300 and the secondary insulator 400. The primary insulator 300 and the secondary insulator 400 are formed by injection molding using a resin material that is electrically insulating. The primary insulator 300 and the secondary insulator 400 are members to maintain electrical insulation between the wound wire constructing the stator coil 500 and the stator core 200 and circumferential parts during attaching.

A plurality of convex parts 301 extending toward an outer radial direction are formed in the primary insulator 300. The position and size of the plurality of convex parts 301 are the same as the position and size of the plurality of salient poles 201. At the top part of the plurality of convex parts 301, guard part 302, flatly extending along a circumferential direction and an axial direction, is formed. Also in the secondary insulator 400, similar convex parts 401 and guard parts 402 are formed. These guard parts 302 and 402 control the shape of the winding so as not to disturb the shape of the stator coil 500 when a coil is wound around the plurality of salient poles 201.

In the primary insulator 300, a plurality of frame bodies 303 extending along the axial direction are formed. The frame body 303 forms a shape in which a central part of outer circumference of one edge of square is cut, and the shape thereof corresponds to a shape of a space 205 existing between the salient poles 201 of the stator core 200. Furthermore, the frame body 303 having a longer size along the axial direction and the frame body 303 having a shorter size along the axial direction are alternately formed. On the other hand, also in the secondary insulator 400, frame body 403 having a longer size along the axial direction and frame body 403 having a shorter size along the axial direction are formed alternately and so as to be in an opposite positional relationship with the frame bodies 303. Therefore, when the primary insulator 300 and the secondary insulator 400 are attached on the stator core 200, the frame bodies 303 and the frame bodies 403 engage in the spaces 205, and top edges of the frame bodies 303 and the frame bodies 403 are contacted so as to insulate the surface of the stator core 200 forming the spaces 205. In this way, the primary and the secondary insulators 300 and 400 insulate the entire circumference of and around the plurality of salient poles 201, so as not to contact the stator coil 500 and the stator core 200.

A pin 405 extending along the axial direction is formed at a base 404 in FIG. 1. The base 404 engages at the hole 204 of the stator core 200, and the pin 405 is used as positioning with respect to the other devices.

FIGS. 2 to 5 show a condition in which in the structure shown in FIG. 1, the primary insulator 300 and the secondary insulator 400 are attached on the stator core 200 and the wire is wound around the plurality of salient poles 201 that is covered with the primary insulator 300 and the secondary insulator 400 so as to form the stator coil 500. In this condition, the stator coil 500 is wound around each of the plurality of salient poles 201.

Figure 3:
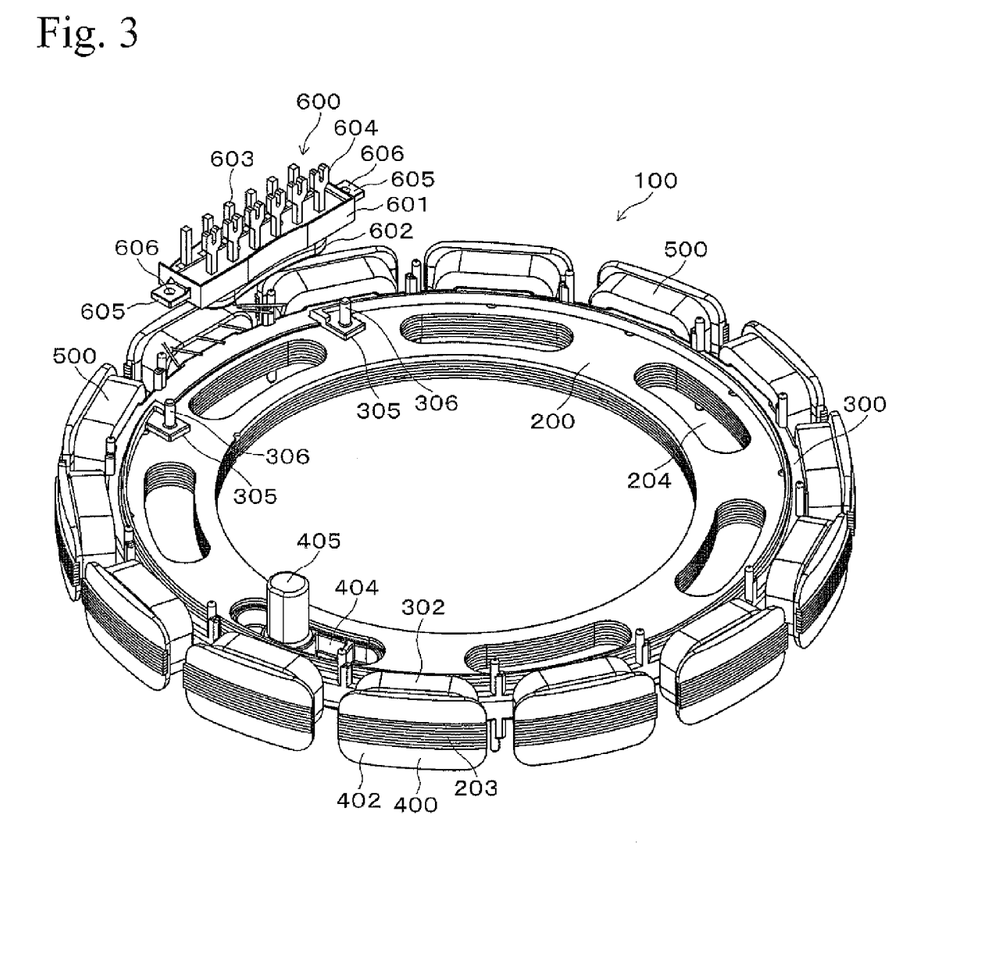
FIG. 3 is a perspective view showing the stator according to the first Embodiment.

A terminal base 600 (the terminal holding part) is shown in FIGS. 1 and 3. The terminal base 600 is approximately constructed by a terminal base body 601 having approximately a square shape and an engaging part. 602 projecting from the lower surface of the terminal base body 601. As shown in FIG. 3, the engaging part 602 forms a planar shape similar to the hole 204 of the stator core 200, and engages in the hole 204. In the terminal base body 601, a plurality of terminal pins (terminals) 603 project along the axial direction, and a plurality of output terminals 604 that are connected to the plurality of terminal pins 603 project along the axial direction.

At both side parts of the terminal base body 601, brackets 605 are formed, and a hole 606 is formed in each bracket 605. On the other hand, at the inner circumferential part of the primary insulator 300, brackets 305 projecting to the inside are formed, and a pin 306 projecting along an axial direction is formed at each bracket 305.

2. Assembly Procedure

One example of an assembly procedure for the stator 100 of the VR type resolver having the above structure is explained. First, multiple thin plates of which silicon steel plates are press-formed in a shape shown in FIG. 1 are prepared. Then, they are stacked to obtain the stator core 200. Next, the stator core 200 is maintained in a condition of being sandwiched between the primary insulator 300 and the secondary insulator 400. In this condition, the engaging part 602 of the terminal base 600 is engaged in the hole 204 of the stator core 200. In this time, the pins 306 of the primary insulator 300 are inserted into the holes 606 of the terminal base 600.

Figure 2:
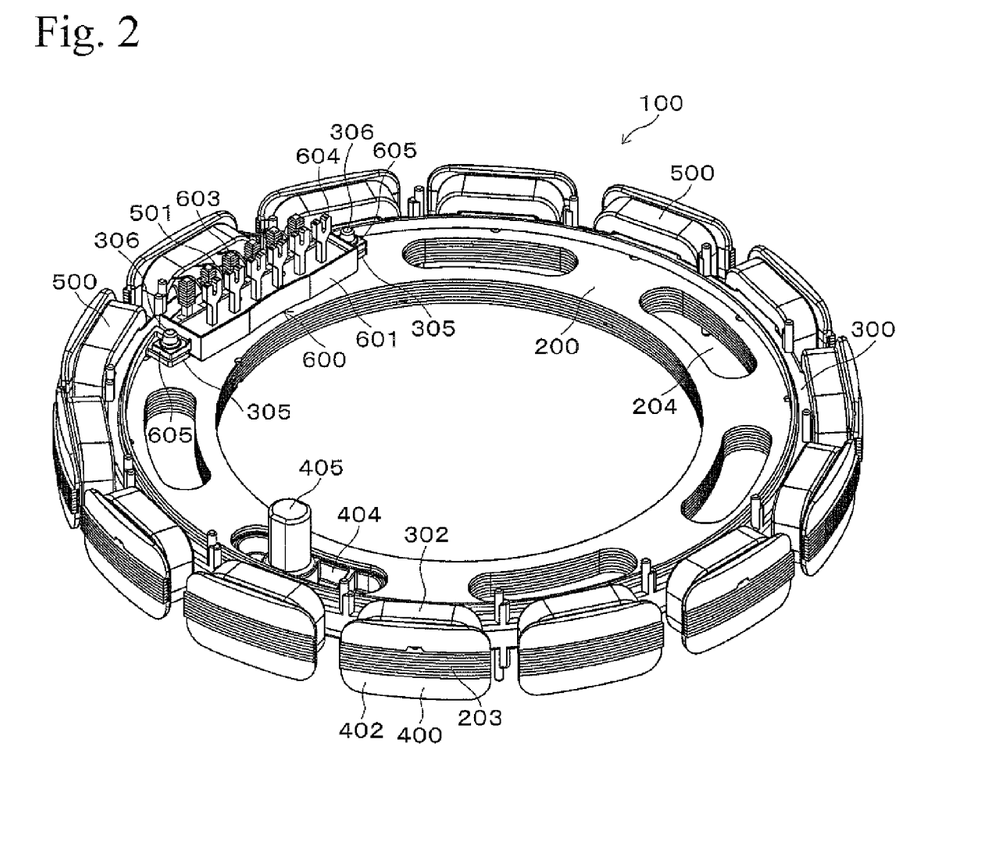
FIG. 2 is a perspective view showing the stator according to the first Embodiment.
Figure 4:
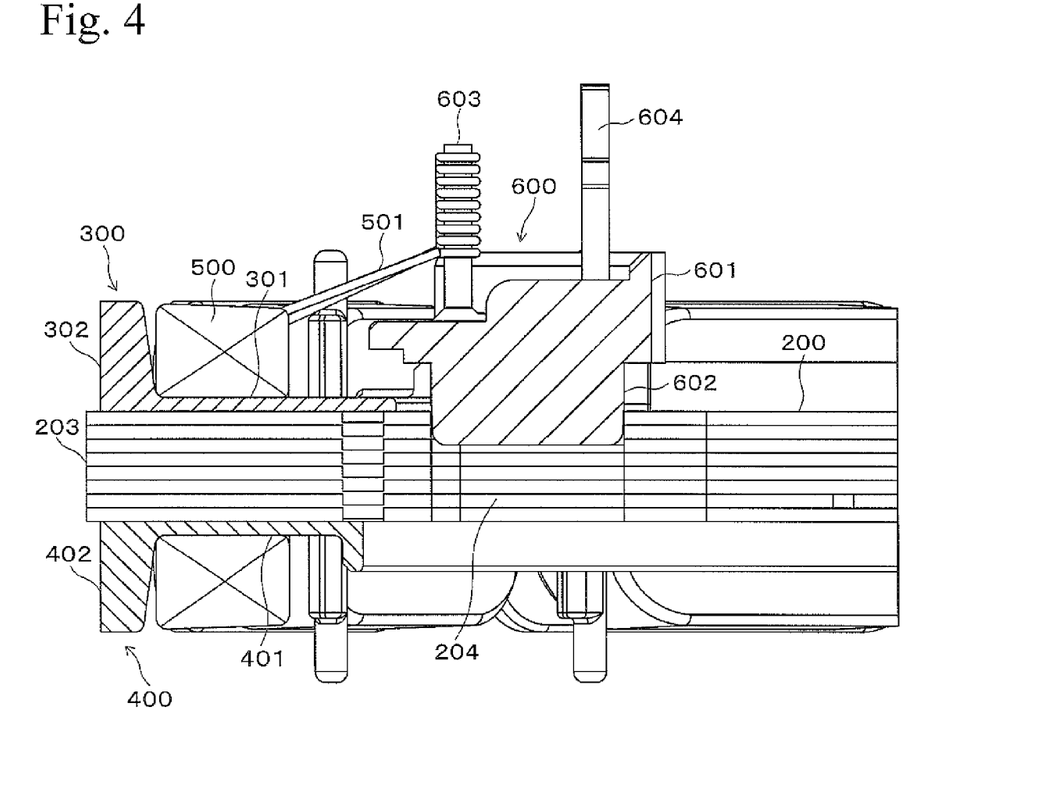
FIG. 4 is a cross-sectional view showing the stator according to the first Embodiment.
Figure 5:
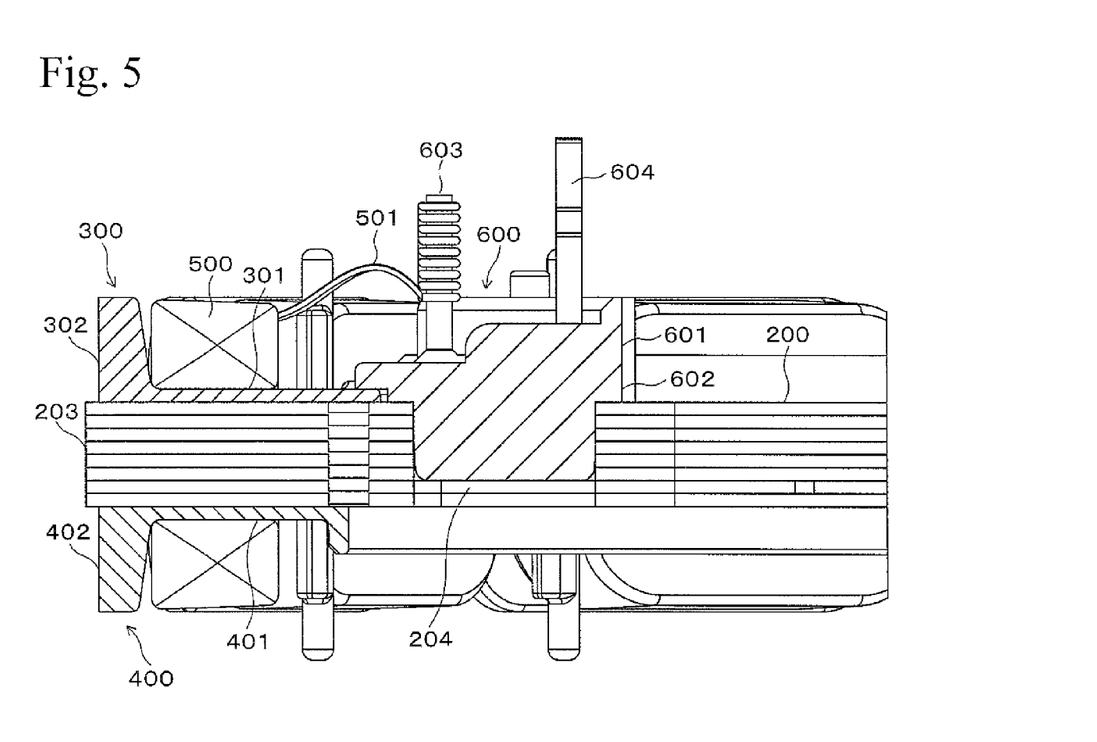
FIG. 5 is a cross-sectional view showing the stator according to the first Embodiment.

As shown in FIG. 4, while the terminal base 600 is held in a floating condition from the upper surface of the stator core 200 (primary position), the wire is wound around the plurality of salient poles 201 of the stator core 200 so as to form the stator coil 500. Furthermore, a lead wire 501 of the stator coil 500 is entwined on the plurality of terminal pins 603 while being in a condition of tension, and the entwined part is fixed by soldering or welding. Next, as shown in FIG. 5, the terminal base 600 is moved to the stator core 200 side, so that the lower surface of the terminal base body 601 contacts the upper surface of the stator core 200 (secondary position). In this way, a slack part is produced along the lead wire 501. Then, the end part of the pins 306 of the primary insulator 300 is melted and deformed so as to fix the terminal base 600. In this way, the condition shown in FIGS. 2 and 5 is obtained. It should be noted that the wire winding operation around the plurality of salient poles 201 and latter operations are automatically performed by a wire winding device.

In the stator 100 of the VR type resolver having the above structure, since the terminal base 600 is moved to the stator core 200 side so that there is slack in the lead wire 501 after the lead wire 501 is entwined and fixed to the plurality of terminal pins 603, a special jig is no longer necessary, and the lead wire 501 can be slack even in a structure in which a distance between the end part of the stator coil 500 and the plurality of terminal pins 603 cannot be maintained. Therefore, the lead wire 501 can be prevented from breaking due to temperature changes or the like. Furthermore, since the terminal base 600 is movable with respect to the primary insulator 300, the moving direction can be appropriately selected, the degree of freedom in design is increased compared to a structure in which a terminal is directly formed to an insulator, thereby broadly enabling the ability to meet customer needs.

In particular, in the above embodiment, since the terminal base 600 is arranged so as to be movable along the axial direction, it is not necessary to project the terminal base 600 to the outer circumferential side of the primary insulator 300, and the VR type resolver can be made in a reduced size. Furthermore, in the above embodiment, the engaging part 602 of the terminal base 600 exists in the hole 204 of the stator core 200, and size of the VR type resolver along the axial direction can be reduced.

3. Modifications

Figure 6:
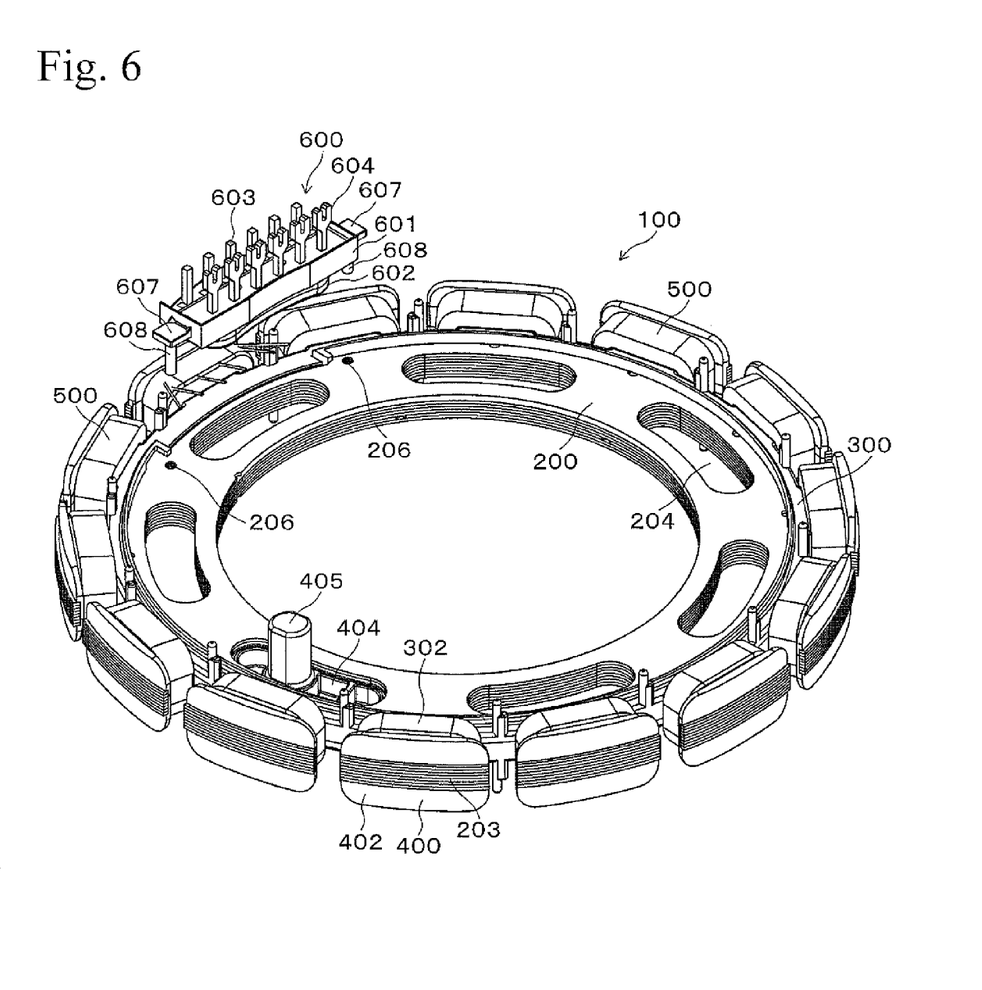
FIG. 6 is a perspective view showing the stator according to the variation of the first Embodiment.

FIG. 6 shows a modification of the above first Embodiment. As shown in FIG. 6, holes 206 penetrating along the axial direction are formed in the stator core 200. On the other hand, a pin 608, which projects along the axial direction and which is to be inserted in the holes 206, is formed at each bracket 607 of the terminal base 600. Fitting tolerance of the pin 608 and the hole 206 is so as to be interference fit. Therefore, the pins 608 are press-fitted in the holes 206.

In the VR type resolver stator 100 of the above structure, in order to attach the terminal base 600 to the stator 100, about half of the lengths of the pins 608 are press-fitted into the holes 206. Then, while maintaining a condition in which the terminal base 600 floats from the upper surface of the stator core 200, the wire is wound around the plurality of salient poles 201 of the stator core 200 under the conditions so as to form the stator coil 500. Furthermore, the lead wire 501 of the stator coil 500 is entwined around the plurality of terminal pins 603, and the entwined parts are fixed by soldering or welding. Then, the terminal base 600 is moved toward the stator core 200 side so as to contact the lower surface of the terminal base body 601 onto the upper surface of the stator core 200. In this way, the lead wire 501 becomes slack. Furthermore, the pins 608 are buried completely in the holes 206, and the terminal base 600 is fixed to the stator core 200 due to frictional resistance between the pins 608 and the holes 206.

In the VR type resolver stator 100 having the Above structure, not only can actions and effects similar to those of the first embodiment be obtained, but in addition, since the pins 608 are press-fitted into the holes 206 by moving the terminal base 600 to the stator core 200, number of processes is reduced and the operation is facilitated, and the terminal base 600 can be strongly fixed because of fixation of the pins 608 to the stator core 200.

4. Second Embodiment

The second embodiment of the present invention is explained with reference to FIGS. 7 to 10.

Figure 7:
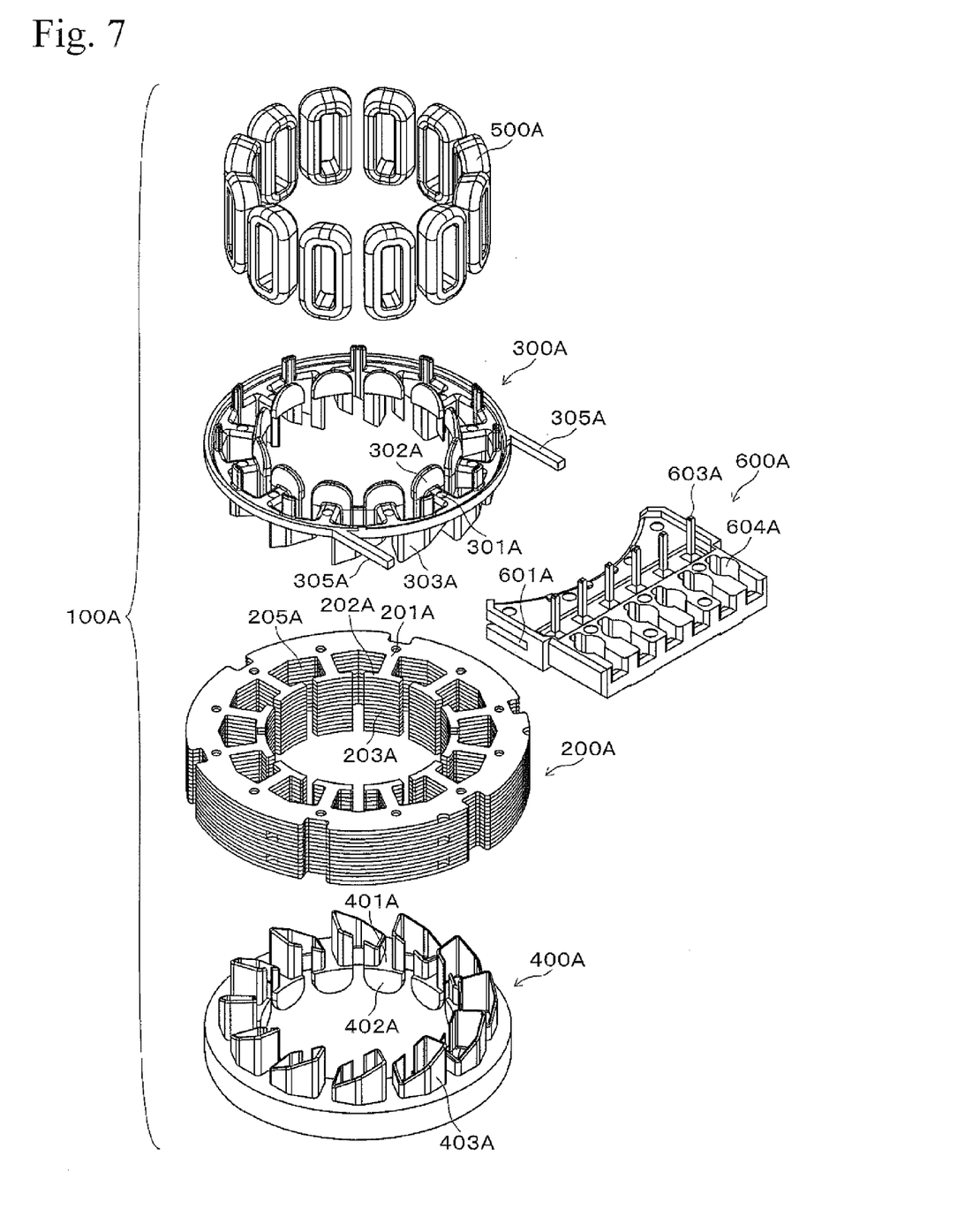
FIG. 7 is an exploded perspective view showing the stator in the VR type resolver according to the second Embodiment of the present invention.

FIG. 7 is an exploded perspective view showing a condition in which a stator 100A of a VR type resolver of the second embodiment is disassembled along the axial direction. The stator 100A has an approximately circular shape. At the inside of the stator 100A, a rotor that is constructed of a soft magnetic material is held in a condition so as to be rotatable with respect to the stator 100A. It should be noted that the figure and the explanation of the rotor structure is omitted since it is as same as that of an ordinary VR type resolver.

The stator 100A includes a stator core 200A. The stator core 200A has a structure in which a soft-magnetic material (silicon steel plate, for example) is processed by press-cutting into approximately circular shapes, and the multiple plates are stacked along the axial direction, as shown in FIG. 7. In the stator core 200A, a plurality of salient poles 201A, extending toward an inner radial direction, are formed. The plurality of salient poles 201A function as magnetic poles, and a stator coil (wound wire) 500A is formed by winding a wound wire around the salient pole via an insulator, as mentioned below. FIG. 7 shows the stator coils 500A in a virtual condition in which they are detached from the plurality of salient poles 201A. At the top part of the plurality of salient poles 201A, a salient pole top part 202A extending flatly along a circumferential direction is formed. At the inner circumferential surface of the salient pole top part 202A, a salient pole surface 203A facing a rotor, which is not shown, is formed.

The stator core 200A is sandwiched between a primary insulator 300A and a secondary insulator 400A from upper and lower directions along the axial direction. That is, the insulator that is attached on the stator core 200A has a structure that can be divided into the primary insulator 300A and the secondary insulator 400A. The primary insulator 300A and the secondary insulator 400A are formed by injection molding using a resin material having electrical insulating property. The primary insulator 300A and the secondary insulator 400A are members to maintain electrical insulation between the wound wire forming the stator coil 500A and the stator core 200A and circumferential parts during attaching.

A plurality of convex parts 301A, extending toward an inner radial direction, are formed in the primary insulator 300A. The position and size of the plurality of convex parts 301A are the same as the position and size of the plurality of salient poles 201A. At the top part of the plurality of convex parts 301A, guard part 302A flatly extending along a circumferential direction and an axial direction is formed. Also, in the secondary insulator 400A, similar convex parts 401A and guard parts 402A are formed. These guard parts 302A and 402A control the shape of the winding so as not to disturb the shape of the stator coil 500A during the winding of the coil around the plurality of salient poles 201A.

In the primary insulator 300A, a plurality of frame bodies 303A, extending along the axial direction, are formed. The plurality of frame bodies 303A form a shape in which a central part of an inner circumference of one edge of square is cut, and the cross-sectional shape thereof corresponds to a cross-sectional shape of space 205A existing between the plurality of salient poles 201A of the stator core 200A. Furthermore, the top edge of the frame body 303A is inclined so that a length along the axial direction increases in a circumferential direction in the clockwise direction in FIG. 7.

On the other hand, also in the secondary insulator 400A, a plurality of frame bodies 403A, extending along the axial direction, are formed. The frame body 403A forms a shape in which a central part of an inner circumference of one edge of square is cut, and the cross-sectional shape thereof corresponds to a cross-sectional shape of space 205A existing between the salient poles 201A of the stator core 200A. Furthermore, the top edge of the frame body 403A is inclined so that the length along the axial direction decreases in a circumferential direction in the clockwise direction in FIG. 7.

Therefore, when the primary insulator 300A and the secondary insulator 400A are attached on the stator core 200A, the frame bodies 303A and the frame bodies 403A engage in the spaces 205A, and top edges of the frame bodies 303A and the frame bodies 403A are contacted so as to insulate the surface of the stator core 200A forming the spaces 205A. In this way, the primary and the secondary insulators 300A and 400A insulate the entire circumference of and around the plurality of salient poles 201A, so as not to contact the stator coil 500A and the stator core 200A.

Figure 8:
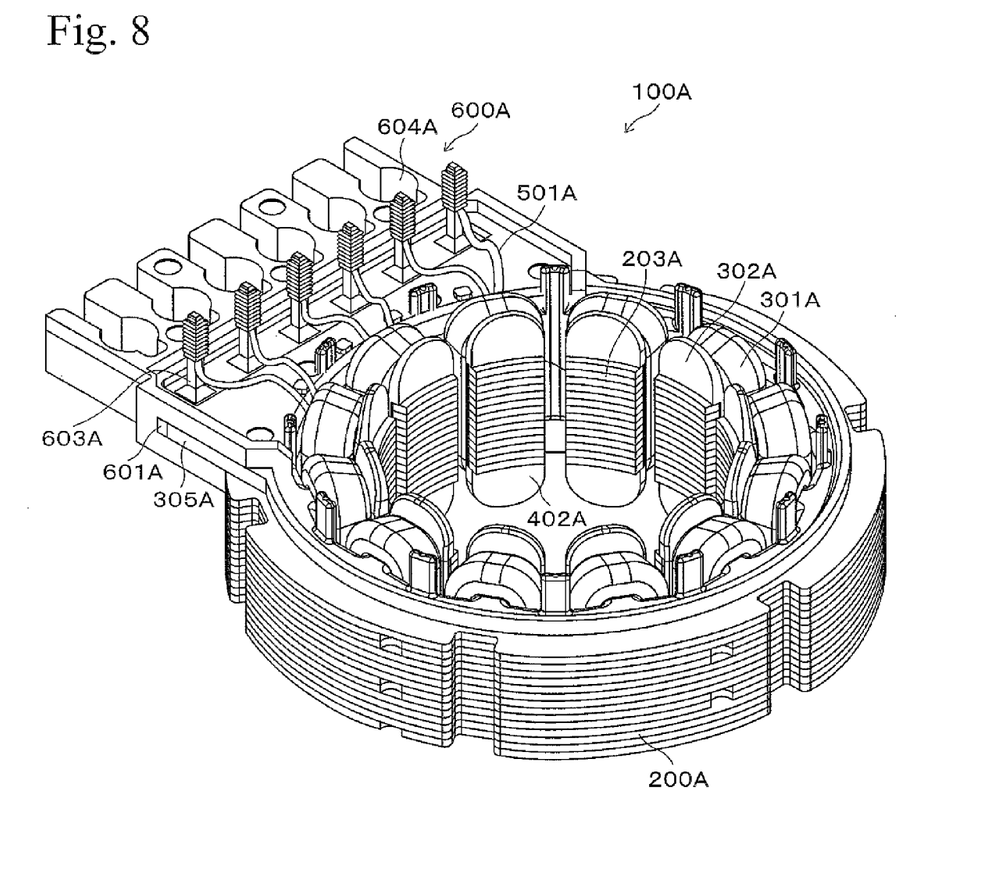
FIG. 8 is a perspective view showing the stator according to the second Embodiment.
Figure 9:
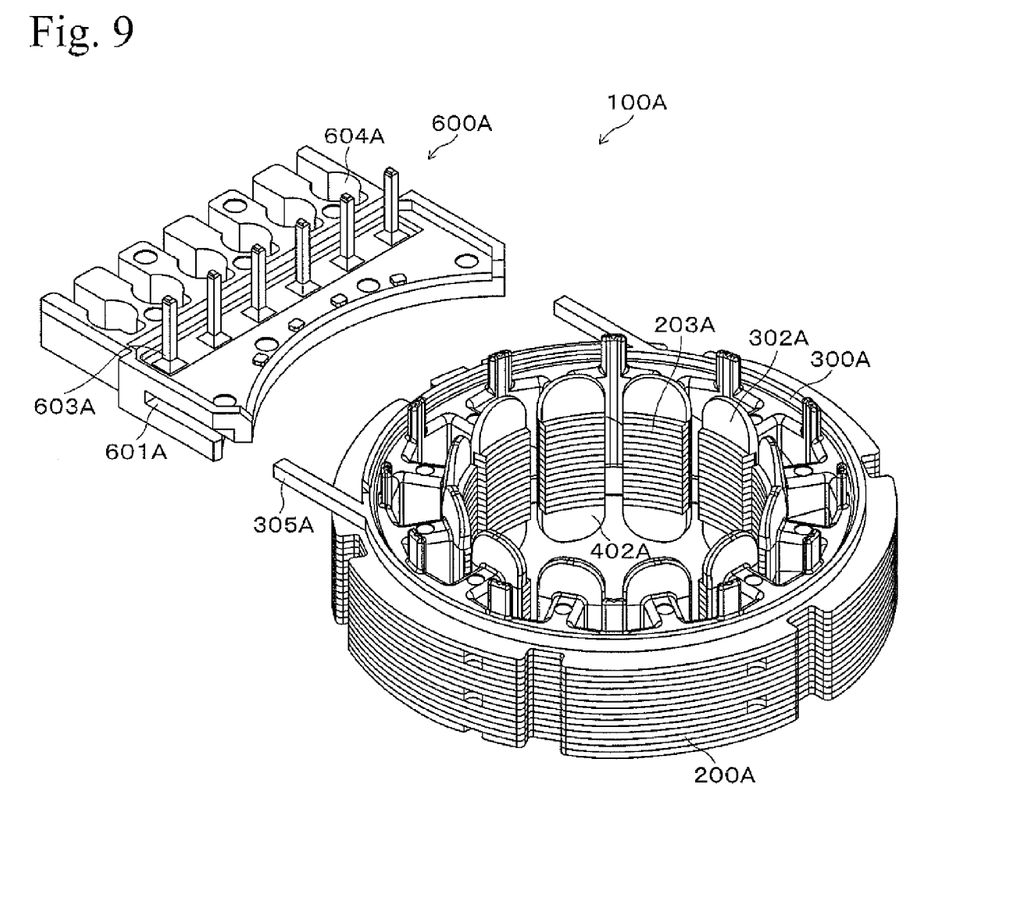
FIG. 9 is a perspective view showing the stator according to the second Embodiment.
Figure 10:
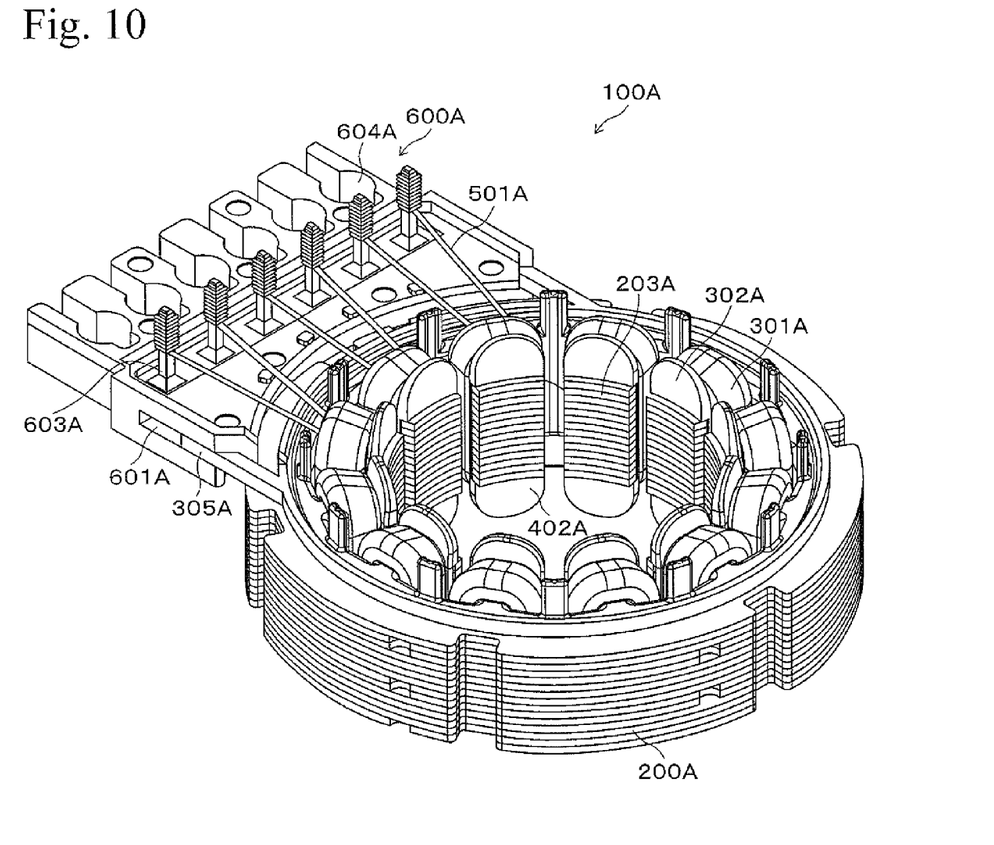
FIG. 10 is a perspective view showing the stator according to the second Embodiment.

FIGS. 8 to 10 show a condition in which in the structure shown in FIG. 7, the primary insulator 300A and the secondary insulator 400A are attached on the stator core 200A and the wire is wound around the plurality of salient poles 201A that are covered with the primary insulator 300A and the secondary insulator 400A so as to form the stator coil 500A. In this condition, the stator coil 500A is wound around each of the plurality of salient poles 201A.

A terminal base the terminal holding part) 600A in FIG. 7. is approximately square shaped, and one side surface thereof is an arc shape that fits along the outer circumferential surface of the primary insulator 300A. At each of both side surfaces of one side of the terminal base 600A, a rail 601A is formed. A plurality of terminal pins 603A are attached projecting toward the axial direction on the terminal base 600A. At the other side of the terminal base 600A, a plurality of concave parts 604A in which output terminals (not shown) for connecting to the plurality of terminal pins 603 are to be attached are formed. On the other hand, on the outer circumferential part of the primary insulator 300A, guides 305A, projecting to the outside, are formed.

5. Assembly Procedure

One example of an assembly procedure of the stator 100A of the VR type resolver having the above structure is explained. First, multiple thin plates of silicon steel press-formed in a shape shown in FIG. 7 are prepared. Then, they are stacked to obtain the stator core 200A. Next, the stator core 200A is maintained sandwiched between the primary insulator 300A and the secondary insulator 400A, as shown in FIG. 9. Then, the guides 305A of the primary insulator 300A are inserted into the rails 601A of the terminal base 600A, and the terminal base 600A is made to come close to the primary insulator 300A.

As shown in FIG. 10, while the terminal base 600A is held apart from the primary insulator 300A at a certain distance (primary position), the wire is wound around the plurality of salient poles 201A of the stator core 200A so as to form the stator coil 500A. Furthermore, the lead wire 501A of the stator coil 500A is entwined around the plurality of terminal pins 603A while being under tension, and the entwined parts are fixed by soldering or welding. Next, as shown in FIG. 8, the terminal base 600A is moved to the primary insulator 300A side, so that the arc side surface of the terminal base 600A contacts the primary insulator 300A (secondary position). In this way, a slack part is produced along the lead wire 501A. Then, the interface of the rail 601A and the guide 305A is melted so as to fix the terminal base 600A. In this way, the conditions shown in FIG. 8 are obtained. It should be noted that the wire winding operation around the plurality of salient poles 201A and latter operation are automatically performed by a wire winding device.

In the VR type resolver stator 100 having the above structure, not only can actions and effects similar to those of the first embodiment be obtained, but in addition, since the lead wire 501A is slack by moving the terminal base 600A close to the stator core 200A side, the amount of projection of the terminal base 600A in the radial direction can be reduced, thereby reducing size of the resolver.

The present invention can be used as a resolver such as a VR type resolver or the like.

What is claimed is:

1. A resolver comprising:
  a rotor;
  a stator core having multiple salient poles extending in a radial direction;
  an insulator covering the salient poles of the stator core for insulating;
  a wound wire wound around the salient poles via the insulator;
  multiple terminals to which a lead wire is connected from the end of the wound wire;
  a terminal holding part holding the terminals; and
  a fixing element to fix the terminal holding part,
  wherein the terminal holding part is movable from a primary position toward a second position with respect to the insulator,
  the terminal holding part at the primary position is apart from the stator core,
  the terminal holding part at the second position is fixed to the stator core or the insulator by the fixing element,
  the lead wire connected to the terminal is under tension at the primary position, and
  the lead wire connected to the terminal is slack at the second position.

2. The resolver according to claim 1,
  wherein the terminal holding part is arranged to be movable in a radial direction or in an axial direction with respect to the insulator.

3. The resolver according to claim 2,
  wherein the stator core has a hole that opens at a surface facing the thickness direction, and the terminal holding part engages in the hole in a condition freely moving forward and back.

4. The resolver according to claim 2,
  wherein the fixing means has a pin that is arranged on the insulator, and a hole that is formed in the terminal holding part and to which the pin engages, and
  the pin is inserted in the hole when the terminal holding part is arranged at the secondary position, and the end part of the pin is fixed to the hole so that the terminal holding part is fixed at the secondary position.

5. The resolver according to claim 3,
  wherein the fixing means has a pin that is arranged on the insulator, and a hole that is formed in the terminal holding part and to which the pin engages, and
  the pin is inserted in the hole when the terminal holding part is arranged at the secondary position, and the end part of the pin is fixed to the hole so that the terminal holding part is fixed at the secondary position.

6. The resolver according to claim 2,
  wherein the fixing means has a pin that is arranged on the terminal holding part, and a hole that is formed in the stator core and to which the pin engages, and
  the pin is press-fitted in the hole when the terminal holding part is arranged at the secondary position, so that the terminal holding part is fixed at the secondary position.

7. The resolver according to claim 3,
  wherein the fixing means has a pin that is arranged on the terminal holding part, and a hole that is formed in the stator core and to which the pin engages, and
  the pin is press-fitted in the hole when the terminal holding part is arranged at the secondary position, so that the terminal holding part is fixed at the secondary position.

8. The resolver according to claim 1,
  wherein a guide projecting to outer direction of the radial direction of the stator core is arranged on the insulator,
  a rail guiding the guide is arranged on the terminal holding part, and
  the guide and the rail are mutually fixed when the terminal holding part is arranged at the secondary position, so that the terminal holding part is fixed at the secondary position.

9. A method for producing the resolver, the method comprising the steps of:
  (1) arranging an insulator on a stator core having multiple salient poles extending in a radial direction, which covers and insulates the salient poles of the stator core,
  (2) winding a wound wire around the salient poles via the insulator,
  (3) attaching a terminal holding part having multiple terminals onto at least one of the insulator and the stator core,
  (4) attaching a lead wire from an end of the wound wire to the terminal in a condition so that the lead wire is under tension,
  (5) making the lead wire under tension slack toward the stator core with respect to the terminal holding part by moving the terminal holding part, and (6) fixing the terminal holding part to at least one of the insulator and the stator core while maintaining the slack condition of the lead wire.

10. The method for producing the resolver according to claim 9,
wherein the stator core is attached to a wire winding device to perform the step (2) after the steps (1) and (3) are completed,
the step (4) is performed and the lead wire is fixed to the terminal by the wire winding device while maintaining the condition in which the terminal holding part is held by the wire winding device, and
the steps (5) and (6) are performed by the wire winding device.

* * * * *